June 16, 1931.         J. R. CROSSAN         1,810,038
SELF SEALING TIRE TUBE
Filed Dec. 10, 1927
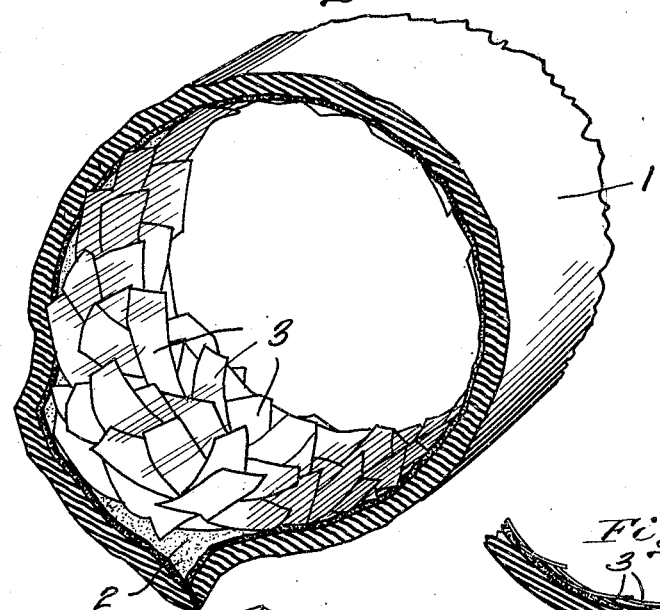
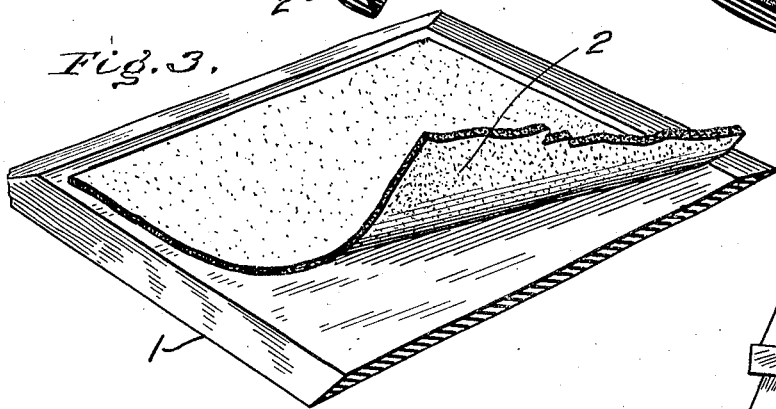
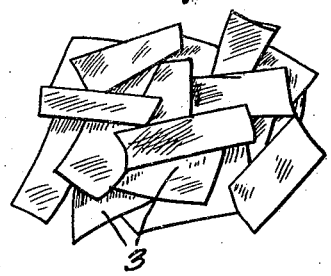
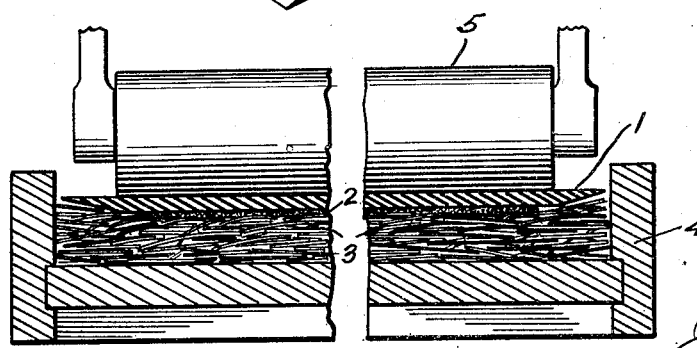
INVENTOR.
Jesse R. Crossan
BY
Rogers, Kennedy & Campbell
ATTORNEYS Patented June 16, 1931

1,810,038

UNITED STATES PATENT OFFICE

JESSE R. CROSSAN, OF WADSWORTH, OHIO, ASSIGNOR TO SEIBERLING RUBBER COMPANY, A CORPORATION OF DELAWARE

SELF SEALING TIRE TUBE

Application filed December 10, 1927. Serial No. 239,029.

This invention relates to inner tubes for automobile tires, contemplating as it does an improved form of puncture-proof or self-sealing tube.

Inner tubes of this description are frequently composed of a body portion of rubber having on its inner face a layer of soft plastic sealing composition which in the event of a puncture will flow or be drawn into the hole produced by the puncturing object upon its withdrawal. In the manufacture and use of such tubes however it is necessary in some way to prevent the inner surfaces of the plastic layer from sticking together when brought into contact, and to meet this necessity, it has been proposed to cover the inner surface of the plastic layer with a continuous strip or layer of paper or tin foil. While either of these expedients would be effective for the intended purpose, both are objectionable for other reasons. In practice these inner tubes undergo considerable expansion when inflated,—whether as used in the tire casings or during vulcanization,—and it has been found that the protective strips or layers as heretofore proposed give rise to localized stretching with its consequent disadvantages. Thus, in the case of an endless protective strip, either the rubber tube cannot expand as it should, or else the protective strip will break and leave a gap between its separated ends, imposing the entire stretch upon the small portion of the rubber bridging the gap. This localized region of the rubber body portion will naturally thin out as a result of the stretch imposed upon it and produce a weak spot in the tube. The last mentioned result will likewise occur if the protective strip in the first instance is applied with its ends disconnected or unlapped rather than in continuous or endless form.

In overcoming the above and other objections of the prior art, it is proposed according to the present invention, specifically, to cover the inner surface of the plastic sealing composition with a multitude of small particles of protective material, these particles being arranged in scale-like fashion over the entire surface of the sealing composition. The protective covering is thus composed of a series of broken up pieces which, being separate and disconnected from each other, permit the tube to expand freely and uniformly at all points and without danger of localizing the stretch in any particular region. Paper or tin foil, if used in the manner stated, will answer the purpose satisfactorily, as well as other materials, but it has been found that the best results are obtained by the use of a cellulose product such as cellophane. This latter substance is peculiarly adapted for the intended purpose, as it has a smooth glossy surface which will not adhere to nails, thorns, or the usual objects which puncture tubes; consequently when a nail enters the tube, it will push the cellophane scale to one side without necessarily puncturing it, and in either case, when the nail is pulled out, the cellophane will not follow it into the hole produced by the puncture, but will allow the plastic composition to flow or be drawn into the hole and seal it.

It will thus be seen that the improved tube possesses all the advantages of the prior art tubes as well as additional advantages of its own. Being free from localized stretching, the tube will be stronger, more durable, and possess a much longer life than its predecessors, and having a protective covering which exhibits little or no interference with the sealing composition, the puncture-proof or self-sealing qualities of the tube are necessarily greatly improved.

Referring to the drawings:

Fig. 1 is a fragmentary perspective view of an inner tube constructed in accordance with this invention;

Fig. 2 is a fragmentary cross sectional view thereof;

Fig. 3 is a perspective view of a flat sheet of rubber such as is used to make up the body portion of the tube and its inner layer of soft plastic sealing composition;

Fig. 4 is a cross sectional view of a container for the small particles of protective material and showing the manner in which these particles are affixed to the inner surface of the sealing composition layer; and Fig. 5 is a plan view of a small group of the protective particles showing the indiscriminate manner in which they are placed in their container.

As shown in Fig. 1, the improved inner tube comprises a body portion 1 composed of vulcanized rubber and an inner layer 2 of soft plastic sealing composition, this composition being likewise composed of rubber but compounded to resist vulcanization so as to remain in its plastic state after the body portion 1 has been fully vulcanized, all as well known in the art.

According to the present invention, and as also shown in both Figs. 1 and 2, the inner surface of the composition layer 2 is completely covered with a multitude of small particles 3 of suitable protective material, which may be paper or tin foil, but which is preferably cellophane. Owing to the manner of application, subsequently to be described, the small protective particles 3 are arranged in scale-like fashion on the composition layer 2, being affixed to it at spots of small area but nevertheless, by reason of their great number and overlapping character, covering all portions of the sticky surface.

While the improved tube may be manufactured by different methods, the following method is preferred: The body portion 1 is first produced in the form of a flat sheet or slab, as shown in Fig. 3, having previously been calendered to width and subsequently cut to length. The layer 2 of plastic sealing composition is likewise produced in sheet or slab form, either by means of a calender or a tubing machine, and then it is laid upon the inner surface of the body portion 1, to which it will closely adhere, see also Fig. 3. As will be noted, the plastic layer 2 is made slightly shorter and narrower than the body portion 1 so as to leave narrow strips or portions at the ends and edges of the body portion for lapping purposes when made into tubular form.

The next step in the process is to apply the small protective particles 3 to the composition layer 2 so as to cover up its tacky inner surface and thus prevent the parts from sticking together in their future handling. This may be done in a variety of ways but as a simple method the small particles 3 are laid in a thick bed in a trough or container 4, which is wider than the composite sheet formed by the body portion 1 and its plastic composition layer 2, and such composite sheet is then placed within the trough with the composite layer facing downwardly for contact with the particles 3, pressure being applied to the sheet as by means of a hand roller 5, the tacky nature of the soft plastic composition causing the particles to stick to its inner surface throughout its whole extent. As shown in Fig. 5, the protective particles 3 are arranged in indiscriminate or confused mass within the trough or container 4 like so much confetti and hence will form a scale-like covering for the inner surface of the plastic composition layer 2, such as above described.

The remaining steps may be the same as ordinarily followed in the building and vulcanization of inner tubes. That is to say, after the protective scales or particles have been applied to the composite rubber sheet in the manner above described, the sheet is made into tube form and then vulcanized in the usual way. According to the "pole" method, the composite sheet is rolled upon a pole or mandrel into the form of an open-ended tube and then vulcanized in that condition, the ends of the tube being subsequently spliced together after the insertion of the customary inflating valve stem. According to the "drum" method, the composite sheet is made into band form upon a suitable drum or mandrel and the and the edges then turned in and lapped together to produce an endless tube. In this latter method the valve stem is inserted in the tube before vulcanization and the tube is vulcanized while inflated with a pressure medium introduced through the valve stem. More generally, the tube is placed in a mold and vulcanized under the expanding action of steam or other pressure fluid admitted through the valve stem. In this connection it is pointed out that the small particles 3 will permit the raw tube to expand freely and uniformly under the action of the internal steam pressure just as they will permit the final vulcanized tube to expand under air pressure when in use.

The advantages of the invention hereinbefore referred to as well as others will now be entirely clear to those skilled in the art and no further elaboration seems necessary. It should be understood, however, that the invention has only been shown and described in preferred form and by way of example, and that many changes and modifications may be made therein without departing from the spirit of the invention, so long as such changes and modifications come within the scope of the appended claims.

Having thus described my invention, what I claim is:

1. A tire tube composed of rubber and having on its inner surface, at least throughout its tread portion, a layer of soft plastic sealing composition, said composition layer being covered on its inner surface with a series of permanently overlapping broken up pieces of cellulose product.

2. A tire tube composed of rubber and having on its inner surface, at least throughout its tread portion, a layer of soft plastic sealing composition, said composition layer being covered on its inner surface with a number of small, integral, flat, permanently overlapping pieces of protective, non-sealing material, the said pieces being disconnected from each other and affixed in spots to the composition layer so as to be individually displaceable by a puncturing object entering the tube; whereby the sealing composition alone may flow or be drawn into the puncture to heal the same without interference by the protective pieces.

3. A tire tube composed of rubber and having on its inner surface, at least throughout its tread portion, a layer of soft plastic sealing composition, said composition layer being covered on its inner surface with a number of small, integral, flat, permanently overlapping pieces of cellulose product, the said pieces being disconnected from each other and affixed in spots to the composition layer so as to be individually displaceable by a puncturing object entering the tube; whereby the sealing composition alone may flow or be drawn into the puncture to heal the same without interference by the protective pieces.

4. A tire tube composed of rubber and having on its inner surface, at least throughout its tread portion, a layer of soft plastic sealing composition, said composition layer being covered on its inner surface with a series of permanently overlapping broken up pieces of material obtained by the precipitation of the sodium salt of cellulose with ammonium chloride.

In testimony whereof, I have affixed my signature hereto.

JESSE R. CROSSAN.